Oct. 23, 1951     H. M. ZIMMERMAN ET AL     2,572,296
PRIMARY CELL AND BATTERY AND METHOD OF MAKING SAME
Filed Oct. 7, 1948

INVENTORS
HERMAN M. ZIMMERMAN
NELSON C. CAHOON
BY *D. C. Harrison*
ATTORNEY

UNITED STATES PATENT OFFICE 2,572,296

PRIMARY CELL AND BATTERY AND
METHOD OF MAKING SAME

Herman M. Zimmerman, Cleveland, and Nelson C. Cahoon, Lakewood, Ohio, assignors, by mesne assignments, to Union Carbide and Carbon Corporation, a corporation of New York Application October 7, 1948, Serial No. 53,174

14 Claims. (Cl. 136—86)

This invention relates to a deferred-action type dry cell activated by a depolarizing gas and to its method of production. The object of the present invention is to improve upon the prior inventions of George W. Heise and Erwin A. Schumacher, claimed in application Serial No. 52,472, filed October 2, 1948, for Primary Cell and Battery and Method of Making Same, and of Nelson C. Cahoon and George W. Heise, claimed in application Serial No. 52,988, filed October 6, 1948, for Primary Galvanic Cell and Battery and Method of Making Same.

By proceeding in accordance with the present invention the production of highly uniform, lightweight, low cost deferred-action type dry cells is facilitated, a thin metallic anode, or collector, preferably being formed with the highly porous portion of a composite cathode as a unit, fabricated and suitable for storage without deterioration prior to the assembly of the cell, and sufficiently strong, even though of light weight, to withstand the manipulation incident to assembling the cells, the uniformity and production of the cells being facilitated by such prefabrication of parts not requiring moisture at the time the cells are assembled, leaving only the moist portions of the cells to be prepared at the time the cells are fabricated, the moist portions of the cells being so assembled that the escape of moisture during assembly of the cells is substantially eliminated and the cells are very uniform.

Figure 1:
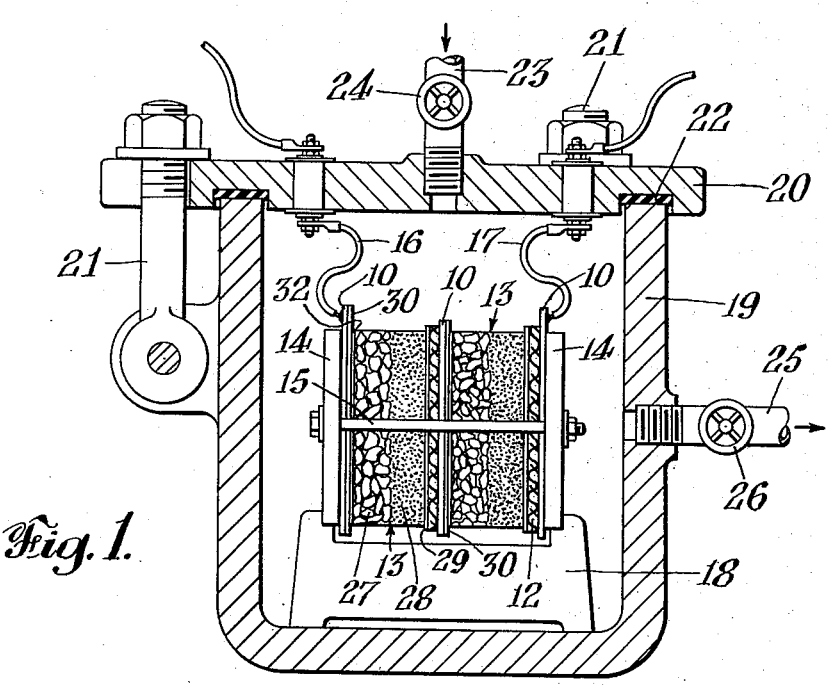
Figure 2:
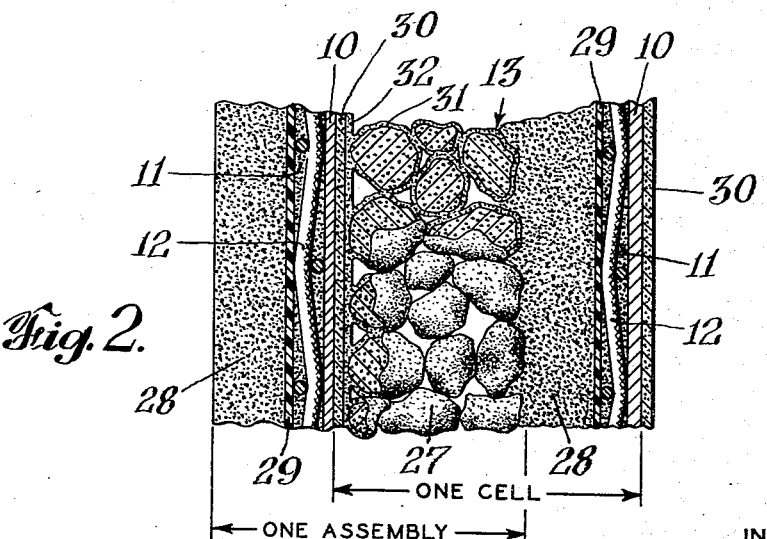

Specific features of the invention and improvements of the prior cells will more readily be understood from the following description taken in conjunction with the accompanying drawing, wherein:

Fig. 1 is a longitudinal elevation, partly in section, showing a battery of only two cells; and Fig. 2 is an enlarged detail showing the wet and dry cathodes hereinafter referred to as well as other elements of the cell.

The battery in the drawing comprises only two cells but it will be understood that any number of such cells may be used. Each cell includes an anode 10, preferably of zinc, but of any other suitable metal such as those mentioned in the foregoing applications of Heise and Schumacher, and Cahoon and Heise. Contiguous to the anode 10 is an immobilized layer of electrolyte paste material 11 surrounded by a netting material 12 such as described in said previously-mentioned applications. The cathode material 13 is in two parts as will later be described and end plates 14, preferably of stiff insulating material, have bolts 15 which clamp the cells between the end plates. Terminal leads 16 and 17 lead off from the battery. A pedestal support 18 maintains the battery elements out of contact with the housing 19. A cover 20 for the housing 19 is held in place by bolts 21. The housing and cover may be made of any suitable imporous material which is resistant to the action of chlorine or other oxidizing gas, for instance, glass, glazed earthen ware, synthetic resins and the like. For short time operation unprotected steel or other metal may be used providing adequate thickness is maintained. A preferred housing consists of a steel shell protected from the action of chlorine and moisture by a resinous coating, e. g. chlorinated rubber, vinyl resins containing chlorine, and the like. A gasket 22 forms a hermetically-tight interior for the housing. A pipe 23 controlled by a valve 24 supplies the chlorine gas to the cell for activation thereof. Prior to activation of the cell, the interior of the housing and the cell may be exhausted of gas by means of a pipe 25 having a control valve 26, this pipe leading to a vacuum pump.

The cathode 13 of the present invention is composite, comprising a dry diffuser cathode 27, each portion of which is substantially as porous and permeable as each other portion, and a wet cathode 28 of carbon black. Both cathodes 27 and 28 are shown in the drawing as being fairly thick; in practice they may be made so thin that the entire cell is not more than ¼ inch thick, the cathode 27 being as thin as 0.070 inch and the cathode 28 as than as 0.030 inch. However, cathodes 27 and 28 may be as thick as 1 inch or more and ½ inch or more, respectively, if desired. The carbon black or wet cathode mix is porous enough to contain the necessary moisture and yet permit permeation by gaseous chlorine. This portion 28 of the composite cathode contains, typically, 200 parts by weight of acetylene black and 519 parts by weight of aqueous 10% zinc-chloride solution and has 15-20% of its volume (wet) as open pores. Variations in the materials, amounts thereof and porosity or per cent pores are in accordance with the description in the foregoing applications of Heise and Schumacher, and Cahoon and Heise. The dry diffuser 27 may be a No. 30 porous carbon, preferably graphite, of the type described in Broadwell and Werking Patent No. 1,988,478 and also in the article entitled "Fabricated Porous Carbon" by L. C. Werking, appearing at vol. 74, page 365 (1938) in The Transactions of The Electrochemical Society, preferably being between 30 and 70% porous as well as electrically conductive. Such a diffuser has a gas permeability of 15.0 cubic feet per square foot per minute at 2 inches of water pressure, as more fully stated in the article. The cell is also operable with available porous carbon having permeabilities as low as 1.5.

The dry cathode 27 may also be molded from granular or powdered carbon particles held together with a binder, as will later be explained. Such a molded diffuser may also have a gas permeability of approximately 15.0 cubic feet per square foot per minute at 2 inches of water pressure. It may however be produced to give permeabilities even higher (say 65 or more) than the 43.0 cubic feet per square foot per minute offered by No. 10 grade porous carbon. Such a high permeability is desirable if extremely high currents are to be drawn from the cell. From strength considerations and ease of manufacture the molded diffuser 27 has preferably two or more layers of carbon granules.

Between the immobilized electrolyte 11 and the wet cathode 28 is a bibulous separator sheet, typically, a layer of cellulose film 29 only about 0.001 inch thick which is non-waterproofed, transparent and previously saturated by immersion in an aqueous 10% zinc-chloride solution, the film having been applied and rolled smooth over the paste surface. Specifically this film is known as Du Pont "cellophane" No. 450–PT plain.

An electrically conductive, moisture-impervious coating 30 lies between the dry cathode and the anode of the next cell.

The immobilized electrolyte paste 11 contains, typically, about 104 parts by weight of water, 26 parts by weight of zinc chloride, 14 parts by weight of methyl cellulose, and 1.8 parts by weight of mercuric chloride filling the cotton mosquito netting 12, about 0.08 ounce being used per square inch giving a layer about 0.013 inch thick. In general the operation of the cell is similar to that described in the aforementioned applications of Heise and Schumacher, and Cahoon and Heise, in which variations in the separator sheets, electrolyte paste and other parts of the cell are disclosed.

Prior to the present invention, in making the cells having the dry cathode and wet cathode, a sheet of the anodic metal, faced on one side with the conductive coating, was overlaid, on the other side, with the netting; anode paste was then applied in syrupy or paste form to fill the meshes of the netting; and the bibulous separator sheet was applied to the paste. This was the anode assembly. In preparing the cathode assembly the dry cathode was made the bottom of the mold within which the wet cathode was molded onto the dry cathode. A battery of cells was assembled by bringing the wet cathode of the cathode assembly against the bibulous separator sheet of an anode assembly, then bringing the conductive coating of a second anode assembly against the dry cathode of the first cell, then bringing the wet cathode of a second cathode assembly against the previously-positioned bibulous sheet of the second anode assembly, and so on. The terminal plate of the last cell was conveniently an anode assembly without the netting, paste and bibulous separator.

A difficulty with the prior process when used in a production job was that in such a procedure the elements containing moisture, that is the anode paste and the wet cathode of different cells, were exposed for such variable lengths of time to air of such varying humidity that the cells were not uniform. Also, the metal anode had to be relatively thick, heavy and stiff to keep from bending while the cell was being assembled; and when a battery of the assembled cells was compressed, there was a tendency for the granules of the dry cathode to puncture the anode metal unless the metal was stiff. Furthermore, a better electrical contact of lower resistance was desired between the dry cathode and the conductive coating than was obtained by laying the conductive coating against the dry cathode during assembly of the cell and thereafter compressing the cell or a battery of cells.

To improve the prior cell and to facilitate its commercial production, according to the present invention an anode-dry cathode unit is first made. In producing this unit a very thin sheet 10 of anodic metal is laid on a flat table or other support. On this is placed a conductive coating 30 which may be a thin layer of non-porous carbon, graphite or the like cemented to the anode 10 or, preferably, a conducting paint or hardenable conductive resin composition, for instance a viscous composition of a thermoplastic resin or of a heat-hardenable resin or a solution of a resin in a volatile solvent, the paint or resin composition containing sufficient powdered or fine granular graphite or other carbonaceous conductor to be electrically conductive and of low resistance. A composition usable as either a cement or a coating is disclosed in U. S. Patent 2,379,976, which may be made fluid with about 50% by weight of solvent based on the resin. When the non-porous conductive coating 30 has been applied, the granular dry cathode 27 is molded against the conductive coating and hardened. The granules are coated with a conducting binder 31, for instance the previously-mentioned paint or resin composition. Preferably the conductor composition 30 and the binder composition are of such nature that they unite, for instance they may have a common solvent or they may unite under heat.

The anode-dry cathode assembly may conveniently be made by placing on the thin anode 10 having the conductive coating 30, a mold of the required size and depth so that when the proper amount of dry cathode mix is in the mold and compressed to the extent desired, the dry cathode 27 is of the size and thickness desired. The anode may be of any size and configuration, conveniently about 0.005 inch thick and 10 by 18 inches along the sides. A stiffer assembly may be made with a zinc alloy containing a stiffening metal, for instance 0.5% copper. In the alloy, copper may be replaced by or used with cadmium or any other stiffening metal more cathodic than zinc as long as the cell has a theoretical minimum of 1.219 grams of zinc for each ampere hour to be drawn from the cell. The conductive coating 30 covers one face of the anode. The bottom surfaces of the sides of the mold rest upon and cover a margin of the coating as wide as desired, conveniently about ¼ inch wide, and allow the dry cathode 27 to be molded against and coextensive with the conductive coating 30 except for the margin, the anode sheet being supported on a flat table with the conductive coating facing upwardly during the molding. The mold is then filled with the dry-cathode mix and compressed to give the thickness desired and then treated, for instance as follows, to give a mass of granules bound with hardened binder. In case the binder composition is a solution of a binder in a volatile solvent, the solvent is allowed to volatilize assisted, if desired, by heating; in case the binder is a heat-hardenable resin, the assembly is heated; in case the binder is a thermoplastic resin, the assembly is heated and then cooled. Preferably, sufficient of the binder is used that some of it goes to the bottom of the mold and forms a conducting layer 32 uniting the cathode particles in the bottom of the mold to the conductive coating 30 on the anode and somewhat filling the lowest layer of spaces between the particles. In this way the thin anode 10 is backed up so that when pressure is applied to it when the cell is clamped under pressure, the anode is not punctured either by the particles of the cathode from the one side or the netting threads 12 from the other side. However, the amount of binder 31 should be the minimum necessary to bind the particles and back up the anode as the dry cathode 27 preferably has a minimum porosity of not less than 10%. The porosity of the wet cathode 28 may be as low as 5%. The porosity and gas permeability of the dry cathode should always be higher than those of the wet cathode.

Where the dry cathode is a sheet of preformed porous carbon, a sheet of the proper size to leave the anode margins and of the required thickness is merely cemented in place by a conducting binder or cement and heated, cooled, treated to volatilize solvent or otherwise treated to adhere the dry cathode to the non-porous conductive layer.

In the cases of both the molded dry cathode and cemented preformed porous carbon sheet, the dry cathode 27 is so strong that extremely thin metal sheets 10 may be used as anodes and yet the anode-dry cathode assembly holds its shape during mechanical manipulation.

The particles of carbon of the wet cathode 28 are preferably of the nature of acetylene black, that is they are carbon blacks with a chain type structure having a mean ultimate particle diameter of from 5 to 100 millimicrons and high gas sorption, and they are relatively soft. Acetylene black as well as certain gas blacks have these characteristics. The particles of carbon of the dry cathode are measured in mesh rather than microns, particles from 0.01 to 0.064 inch being satisfactory.

The dry cathode particles 27 are of low sorptive capacity and may have a discontinuous structure. They are preferably the type of particle of coke and coke graphite which is relatively hard and firm, and they are preferably, at least roughly, rounded so that they do not intermesh but produce a high proportion of openings per unit of volume. The characteristics of the acetylene black afforded a good depolarizing action in the presence of chlorine while the characteristics of coke give a comparatively poor depolarizing action. The particles of the cathode portions are preferably predominantly uniform for each portion so that the openings between the particles are not filled with finer particles.

We have also found that the production of the cell may be improved by cementing the netting 12 in place on the anode 10 prior to the application of the anode paste. Any suitable electrolyte-insoluble or electrolyte-soluble cementing agent, preferably conductive, may be used. However, it is preferred that the cementing agent be electrolyte-soluble or, at least, sorptive of the electrolyte, for instance an alkyl cellulose, a cereal, for instance flour or starch, or a vegetable, animal or synthetic glue, or the like. An electrolyte-insoluble cement prevents the anodic reaction where it covers the anode and is preferably not used, even though it is conductive. A sorptive cementing agent, for instance starch, although not soluble in the electrolyte, allows the electrolyte to wet the anode surface and to react to a large extent. A soluble cementing agent, for instance a water-soluble alkyl cellulose, dissolves in the anode paste within a short time after the cell has been assembled and the entire anode-electrolyte interface is reactive to the greatest extent. The netting 12 may be passed through the fluid cement and then applied to the anode and held in place until the cement has set.

In preparing a battery of cells, to make the first cell, an anode sheet 10 with the netting 12, that is an anode-dry cathode assembly, preferably without the conductive coating 30 and dry cathode 27, is laid upon a flat table, the electrolyte paste 11 is spread on and in the netting of the assembly, and the excess paste, if any, scraped off with a straight edge. A tough, flexible and yieldable bibulous separator sheet 29, wet with electrolyte, is then applied over the netting and paste, care being taken that the paste thoroughly contacts the anode and the bibulous separator with no entrapped air. A mold of insulating material is then placed around the netting-paste-separator sheet assembly and filled with wet-cathode mix 27 and compressed to the extent desired, the sides of the mold being so spaced and sufficiently high and enough cathode mix being used that the wet cathode is of the desired thickness, and the edge of the mix cake is set in about ¼ inch from the edge of the separator sheet. The assembly is then removed from the mold.

In making succeeding cells, the same steps are used except that an anode-dry cathode assembly is used instead of merely the netted anode sheet. The two assemblies having been prepared, they are brought together, the dry cathode 27 of the second assembly being placed against the wet cathode 28 of the first assembly. More assemblies like the second assembly, that is assemblies presenting the dry cathode, are added, dry cathode 27 against wet cathode 28, until the battery contains as many cells as desired. The terminal or conductive element of the last cell may be a sheet of stiff conductive material, for instance of carbon or of metal carrying a coating to prevent local electrochemical action and conveniently may be a sheet of anode metal 10 carrying merely the conductive coating 30 and dry cathode 27, that is an anode-dry cathode assembly without the netting, as shown in Fig. 1 for the left hand cell. The terminal of the first cell may conveniently be the anode 10 thereof as shown in Fig. 1 for the right hand cell. For a single cell, the one terminal may be that previously described for the first cell of the battery and the other terminal may be that previously described for the last cell of the battery.

When the cells are compressed between the end plates 14, the relatively rough face of the dry cathode 27 is forced down into the relatively soft wet cathode 28 and a good low resistance contact is obtained.

The dry cathode 27 is not "bone dry" when the cell is in the housing. The wet electrode elements give off moisture and in the case where the dry cathode is a sheet of porous carbon, the cathode will absorb moisture from the atmosphere surrounding the cell. Where the dry electrode 27 is a bound mass of granules covered with a binder 31 there will be, at least, a molecular layer of moisture upon the surface of the binder; and where the binder is or becomes porous under the conditions obtaining within the housing, there will be a heavier collection of moisture in the dry cathode. Also there is a slight creepage of aqueous electrolyte from the wet cathode 28 into that portion of the dry cathode 27 which contacts the wet cathode. Thus the dry cathode may be very slightly moist but there is no collection of water in the pores of or filling the spaces between the particles of the dry cathode which is substantially as porous and permeable to gas as if it were bone dry. Thus when the housing 19 and cell are evacuated prior to the activation of the cell and the cell is then surrounded with gaseous chlorine, the chlorine readily and quickly passes through and permeates the dry cathode. The chlorine and dry cathode appear to cooperate in the activation of the cell from two different points of view; the chlorine immediately saturates the small amount of moisture in the dry cathode or on the surface of the conducting binder 31 and affords an immediate depolarization action. The products formed by the solution of the chlorine and the depolarization action immediately make the moisture on the dry cathode more conductive. The highly porous dry cathode 27 also allows the chlorine readily to distribute over and to contact substantially the entire flat face of the wet cathode 28 so that the wet cathode readily and quickly absorbs chlorine, more so than if the wet cathode could absorb chlorine only from the sides inwardly, and thus the wet cathode comes into a depolarized condition more quickly than it otherwise would and the entire flat face of the wet cathode nearest the anode can be operable as there are no channels cut in the wet cathode. Thus the dry cathode 27 acts as a diffuser for the chlorine, facilitating the depolarization of the wet cathode 28, and gives an immediate depolarization of the cell, tiding the cell over from the time when the depolarizing gas is admitted to the cell until the time when the wet cathode can absorb sufficient chlorine to depolarize the cell by itself. As the depolarizing action of the dry cathode 27 is decreasing, the depolarizing ability of the wet cathode 28 is increasing. Cells made in accordance with the process and from the assemblies disclosed herein are quite uniform in action as the electrode elements which contain moisture are exposed, during manufacture, to the atmosphere for a minimum length of time and the anode-dry cathode assemblies, including the netting, may be prefabricated and stored without deterioration as they contain no moisture. When the time comes to produce the complete cell it is necessary only to apply the electrolyte paste, cover it with a wet bibulous sheet, tamp in place the wet-cathode mix within the mold, and position a similarly-prepared assembly. By reason of the strength given the anode sheet 10 by the dry cathode layer 27, much thinner metal may be used for the anode than would, alone, withstand the mechanical manipulations to which the anode-dry cathode assembly is subjected.

What is claimed is:

1. A primary galvanic cell comprising an anode and a composite cathode presenting two porous cathode portions of different porosity, the portion of greater porosity being bonded to a conductive element for drawing current from the cell, the bonded faces of said conductive element and said cathode portion being substantially coextensive, the bond being electrically conductive and non-porous.

2. A primary galvanic cell comprising an anode and a composite cathode presenting two porous cathode portions of different porosity, the portion of lesser porosity containing more water than the portion of greater porosity, the portion of greater porosity being bonded to a conductive element for drawing current from the cell, the bonded faces of said conductive element and said cathode portion being substantially coextensive, the bond being electrically conductive and non-porous.

3. A primary galvanic cell comprising an anode and a composite cathode presenting two porous cathode portions of different porosity, the portion of greater porosity being bonded to a conductive element for drawing current from the cell, the portion of lesser porosity lying nearer the anode, the bonded faces of said conductive element and said cathode portion being substantially coextensive, the bond being electrically conductive and non-porous.

4. A primary galvanic cell comprising an anode and a composite cathode presenting two cathode portions of different permeability to gas, the portion of greater permeability being bonded to a conductive element for drawing current from the cell, the bonded faces of said conductive element and said cathode portion being substantially coextensive, the bond being electrically conductive and non-porous.

5. A primary galvanic cell comprising an anode and a composite cathode presenting two cathode portions of different permeability to gas, the portion of lesser permeability containing more water than the portion of greater permeability, the portion of greater permeability being bonded to a conductive element for drawing current from the cell, the bonded faces of said conductive element and said cathode portion being substantially coextensive, the bond being electrically conductive and non-porous.

6. A primary galvanic cell comprising an anode and a composite cathode presenting two porous cathode portions of different depolarizing action, the portion of greater depolarizing action situated nearer the anode, the other portion bonded to a conductive element for drawing current from the cell, the bonded faces of said conductive element and said cathode portion being substantially coextensive, the bond being electrically conductive and non-porous.

7. A primary galvanic cell comprising an anode and a composite cathode presenting two cathode portions, the characteristics of the average particle of the two portions being different, the average particle in one portion having the characteristics of acetylene black with respect to size, gas sorption and chain type of structure, the average particle in the other portion being of the discontinuous type of structure, larger and less sorbtive of gas than the average particle of the first portion, the cathode portion containing the larger sized particle being bonded to a conductive element for drawing current from the cell, the bonded faces of said conductive element and said cathode portion being substantially coextensive, the bond being electrically conductive and non-porous.

8. A primary galvanic cell comprising an anode and a composite cathode having two cathode portions of different characteristics, the first portion being relatively soft and containing a preponderance of relatively fine particles, the second portion being hard relative to the first portion and containing a preponderance of particles coarser than in the first portion, the portions joining with the embedment of particles of one portion in the other, said second portion being bonded to a conductive element for drawing current from the cell, the bonded faces of said conductive element and said cathode portion being substantially coextensive, the bond being electrically conductive and non-porous.

9. A primary galvanic cell comprising an anode and a composite cathode presenting two cathode portions, the average particle size in the two portions being different, the portion containing the particles of larger size being bonded to a conductive element for drawing current from the cell, the bonded faces of said conductive element and said cathode portion being substantially coextensive, the bond being electrically conductive and non-porous.

10. A primary galvanic cell comprising an anode and a composite cathode presenting two cathode portions, the average particle size in the two portions being different, the portion containing the particles of larger size having the particles bonded with a resinous electrically conductive bonding agent, said portion containing the particles of larger size being bonded to a conductive element for drawing current from the cell, the bonded faces of said conductive element and said cathode portion being substantially coextensive, the bond being electrically conductive and non-porous.

11. A primary galvanic cell comprising an anode and a composite cathode presenting two cathode portions, the average particle size in the two portions being different, the portion containing the particles of larger size being bonded to a conductive element for drawing current from the cell, a layer of stiffened bonding agent surrounding the portions of the particles contiguous with the conductive element and extending over the surface of the conductive element to stiffen the conductive element.

12. A primary galvanic cell comprising an anode and a composite cathode presenting two porous cathode portions of different porosity, the portion of greater porosity being a sheet of porous carbon bonded to a conductive element for drawing current from the cell, the conductive element being sheet-like and substantially coextensive with the carbon sheet, the bond being electrically conductive and non-porous.

13. Cells having the construction recited in claim 1, the conductive element being the anode of a second cell presenting a non-porous conductive layer bonded to the anode of the said second cell, the cathode of the first cell being bonded to said conductive layer.

14. A battery of cells having the construction recited in claim 1 in which the conductive element of an intermediate cell is the anode of the next cell presenting a non-porous conductive layer bonded to the anode of said next cell, the cathode of the first-mentioned cell being bonded to said conductive layer.

HERMAN M. ZIMMERMAN.
NELSON C. CAHOON.

REFERENCES CITED

The following references are of record in the file of this patent:

UNITED STATES PATENTS

| Number | Name | Date |
| --- | --- | --- |
| Re. 22,065 | Young | Apr. 7, 1942 |
| 357,646 | Upward et al. | Feb. 15, 1887 |
| 1,182,759 | Emanuel | May 9, 1916 |
| 1,601,036 | Nyberg | Sept. 28, 1926 |
| 1,613,586 | Dam | Jan. 4, 1927 |
| 1,855,677 | Huntley | Apr. 26, 1932 |
| 1,863,794 | Huntley | June 21, 1932 |
| 2,154,312 | MacCallum | Apr. 11, 1939 |
| 2,180,839 | Schumacher et al. | Nov. 21, 1939 |
| 2,275,281 | Berl | Mar. 3, 1942 |
| 2,282,523 | Kreutzer | May 12, 1942 |